(12) United States Patent
Amaro et al.

(10) Patent No.: US 6,557,335 B2
(45) Date of Patent: May 6, 2003

(54) MECHANICAL HARVESTER AND CONTINUOUS ROW HARVESTING METHOD FOR USE IN OVERHEAD TRELLIS SYSTEMS

(75) Inventors: Vernal A. Amaro, Fresno, CA (US); John Paboojian, Jr., Selma, CA (US)

(73) Assignee: Premier Mechanical Orchard Services, L.L.C., Exeter, CA (US)

(*) Notice: Subject to any disclaimer, the term of this patent is extended or adjusted under 35 U.S.C. 154(b) by 0 days.

(21) Appl. No.: 09/784,386

(22) Filed: Feb. 15, 2001

(65) Prior Publication Data

US 2002/0108362 A1 Aug. 15, 2002

(51) Int. Cl.$^7$ ................................ A01D 46/00
(52) U.S. Cl. ........................ 56/328.1; 56/330
(58) Field of Search ................ 56/330, 328.1, 56/DIG. 32, 340.1, 130

(56) References Cited

U.S. PATENT DOCUMENTS

| | | | |
|---|---|---|---|
| 3,698,169 A | * 10/1972 | Simpson | 56/328.1 |
| 4,172,352 A | * 10/1979 | McCarthy et al. | 56/340.1 |
| 4,221,665 A | * 9/1980 | Decker | 209/247 |
| 5,170,614 A | * 12/1992 | Williamson et al. | 56/330 |
| 5,355,667 A | * 10/1994 | Scott | 56/330 |
| 5,411,561 A | * 5/1995 | Conley | 47/58 |
| 5,421,148 A | * 6/1995 | Caraway | 56/328.1 |
| 5,423,166 A | * 6/1995 | Scott | 56/330 |
| 5,647,194 A | 7/1997 | Scott | |
| 5,660,033 A | * 8/1997 | Korthuis et al. | 56/330 |
| 5,711,109 A | * 1/1998 | Pitts | 47/58 |
| 6,009,696 A | * 1/2000 | Walker et al. | 56/328.1 |
| 6,012,276 A | * 1/2000 | Walker et al. | 56/330 |
| 6,076,343 A | 6/2000 | Burke | |

FOREIGN PATENT DOCUMENTS

SU   1367907   * 1/1988 ......... A01D/46/28

OTHER PUBLICATIONS

Christensen, Peter; Lynn, Curtis; Olmo, H.P.; and Studer, H.E., Mechanical Harvesting of Black Corinth Raisins, California Agriculture, Oct. 1970, p. 4–6, vol. 24, No. 10, University of California, U.S.A.

Gould, I.V. and Whiting, J.R., Mechanization of Raisin Production with the Irymple Trellis System, Transactions of the ASAE, Jan.–Feb. 1987, vol. 30, No. 1, American Society of Agricultural Engineers, U.S.A.

* cited by examiner

*Primary Examiner*—Robert E. Pezzuto
*Assistant Examiner*—Árpád Fab Kovács
(74) *Attorney, Agent, or Firm*—Richard A. Ryan

(57) ABSTRACT

A mechanical harvester and harvesting method for harvesting crops grown on an overhead trellis system including a harvester frame having a top portion and opposing sides forming an open frame to allow crop bins or gondolas to pass under the top portion and through the harvester so that the harvester can continuously harvest an entire row of crops. The top portion of the harvester has crop separating mechanisms to dislodge the crop from the overhead plant canopy. The crop falls downward onto a conveyor belt assembly that transports the crop to the front of the harvester where it is deposited onto a pair of cross conveyor belts that conveys it to a central opening for depositing into the bin. A fan is utilized to blow air across the crop material to separate any plant debris from the crop prior to depositing the crop into the bin.

34 Claims, 8 Drawing Sheets

MECHANICAL HARVESTER AND CONTINUOUS ROW HARVESTING METHOD FOR USE IN OVERHEAD TRELLIS SYSTEMS

BACKGROUND OF THE INVENTION

1. Field of the Invention

The field of the present invention relates generally to mechanical harvesters for use in harvesting grapes, raisins and similarly situated crops. More specifically, the present invention relates to such harvesters that are self-propelled and able to separate the crop from overhead vines. Even more specifically, the present invention relates to such mechanical harvesters and methods of harvesting that are suitable for continuously harvesting a single row of crops grown on an overhead trellis system.

2. Background

As is well known, the conventional methods of harvesting grapes, raisins and other vine crops is typically a very labor intensive process requiring a significant number of laborers to separate the crop from the vines. These methods generally require the labor crews to walk through the vineyard and individually cut clusters of fruit from the vine. With regard to raisin production, the conventional method of harvesting raisins require the laborers to place the clusters of raisin grapes on drying trays or strips of paper located along or near the rows of vines. The green raisin grapes are then left on the paper trays for a sufficient period of time to allow the sun to dry them into raisins. In the Central Valley area of California, this typically requires the fruit to lie in the sun for approximately three weeks. During the drying period, the raisins are at risk of being ruined by mold, infestation and rot. This risk can be increased by any rain that may occur during the drying period. After the raisins are sufficiently dry, the paper trays are rolled into sealed packages and set aside for retrieval. The raisins are then picked up and emptied into conventional raisin bulk bins that are pulled behind a tractor on bin trailers through the rows of vines and then delivered for processing. While the conventional method of harvesting grapes and raisins provides the maximum flexibility, it is very expensive due to its labor intensiveness.

Various mechanisms have been developed to improve the efficiency of grape and raisin production and to reduce the costs associated with harvesting grapes and raisins. Some of these mechanisms are addressed to machines capable of removing the green grapes from the vines and placing them on the paper trays for drying. A mechanism for mechanically collecting the raisins placed on paper trays is disclosed in U.S. Pat. No. 4,221,665 to Decker. Other mechanical harvesting of conventionally produced raisins have been developed. In general, the machines for mechanically harvesting conventionally grown and dried grapes and raisins have not been readily accepted due, in part, to the cost of the equipment and the fact it does not reduce the risks associated with rain damage.

To reduce the cost associated with harvesting grapes, raisins and other vine crops, growers have developed various new methods of growing the crops that are more suitable for reducing labor costs. The conventional method of raising grapes or raisins is to grow the vines in separate parallel rows utilizing a trellis system that runs along the row producing rows of vines approximately four to six feet high. With regard to growing raisins, one improvement is referred to as the dried-on-the-vine ("DOV") methods. The DOV methods of growing raisins leaves the grape clusters on the vines during the drying process, as opposed to laying them on paper trays for the dried-on-the-ground method. Labor crews go through the vineyard and cut the fruiting canes so that the grapes on those canes will dry to produce raisins. U.S. Pat. No. 5,411,561 to Conley describes an improved DOV method of producing raisins with a modified conventional trellis system that trains the canes into a divided canopy with the fruiting canes primarily on one side of the rows and renewal canes on the opposite side.

Several harvesting machines have been developed to harvest DOV raisins. Examples of these machines are disclosed in U.S. Pat. No. 5,355,667 to Scott, U.S. Pat. No. 6,009,696 to Walker and U.S. Pat. No. 6,012,276 to Walker. Generally, these patents describe harvesting machines that are either pulled or driven between the rows of vines with a plurality of rods or paddles extending from the side of the harvester such that the rods or paddles engage the plants to dislodge the grapes or raisins therefrom. The dislodged grapes or raisins are collected on a conveyance system and transported up and over the vines into a truck or bin trailer pulled be a tractor in the adjacent row.

There are a number of other methods of growing grapes and raisins that take advantage of the DOV principles. Some of these methods utilize the conventional trellis system while others utilize less commonly employed trellis systems, such as an overhead trellis system. The overhead trellis systems allow the vines to be trained such that the canes grow over the trellis wires disposed between rows of upright posts that are placed along the rows of vines. The posts have one or more cross-arms that are connected to the trellis wires. The canes grow from the head of the vine and are placed across the wires such that the crop will grow in a generally vertical downward direction from the canes between the rows. One method of growing grapes and raisins on an overhead trellis system is disclosed in U.S. Pat. No. 5,711,109 to Pitts, the full disclosure of which is incorporated herein. In this method of growing vines, the vine plants are separated to form four cordons and trained such that two pairs of cordons grow along the rows but opposite each other. Canes produced by the cordons grow substantially perpendicular to the cordons toward the canes produced by an adjacent row of vines over an overhead trellis structure. During each growing season, one row is a fruiting row and the adjacent row is a renewal row. During the following season, the function of the rows is reversed. This method of growing grapes and raisins is referred to as the quadrilateral, alternate bearing method and has been found to substantially increase production of grapes and raisins.

Harvesting overhead trellis systems by hand requires the labor crews to walk or ride on a trailer through the fruiting row to pick off the fruit clusters and deposit them in pans or buckets, which are then dumped into conventional raisin bins or juice gondolas. The bins or gondolas are hauled on trailers and pulled through the rows by tractors. When loaded, the tractor and full containers travel the length of the row and exit at the first available avenue. After exiting the row, the tractor and trailer exchanges the full containers for empty containers and returns back to the beginning of the row to rejoin the picking crew. Second tractor/trailer units are often added to minimize harvesting stoppage. As with other hand harvesting methods, this method is very expensive due to its labor intensiveness.

Mechanical harvesters for harvesting grapes or raisins grown on an overhead trellis system are also known. For instance, U.S. Pat. No. 5,423,166 to Scott is directed to a grape and raisin harvester in the form of a trailer that utilizes a series of spinning rods fashioned into a rotating rolling brush that knocks the grapes or raisins off the plants and into one or more boxes located on the trailer platform. The harvester is pulled along the row by a tractor. The rotating rolling brush, referred to as a shaker head, is raised or lowered by the use of hydraulic cylinders linked to the shaker head. No reference is made to how the full boxes are emptied or replaced with empty boxes so that the harvester can continue to harvest. U.S. Pat. No. 6,012,276 to Walker, primarily a device for harvesting DOV raisins grown on modified conventional trellises, suggests that the harvester head can be disposed such that the beater rods extend upward for use in overhead trellis systems. However, no reference is made to how the conveying system is modified to convey the raisins over the vines.

Another apparatus for mechanically harvesting grapes or raisins developed by Mr. Lee Simpson in Madera County, California, is a self-propelled harvester that utilizes a rotating tubular mechanism to knock off the raisin clusters below the trellis wires into a hopper and a conveyor system to transport the raisins backward to deposit them into a bin attached to forklift-type tines on the back of the harvester. A hand crew follows behind to remove the raisin clusters above the trellis wires or otherwise missed by the rotating tube. After the bin is filled, the harvester is stopped, backs up and then drops the bin on the ground. The harvester then moves forward to space itself from the dropped bin so that an empty bin can be manually moved over behind the harvester so that it may be picked up by the tines on the back of the harvester. A forklift or other apparatus then picks up the full bin and removes it from the row. This system requires the empty bins to either be previously placed, hopefully strategically, along the row or the row adjacent to that being harvested or delivered to the harvester's stop point by a trailer or tractor. Failure to properly place the empty bins requires additional handling of the bins and the labor associated therewith. Even with strategically placed empty bins, this harvester and method of harvesting still requires a significant amount of labor and results in a certain amount of wasted (i.e., non-harvesting) time for dropping off the bins, moving empty bins and retrieving the full bins.

A problem common to the various mechanical harvesting machines and methods is the transfer and removal of the crop from the field or vineyard. This is particularly a problem for growing methods that utilize an overhead trellis system, where trellis wires prevent or make difficult the transfer of crop over the top of the vines to an adjacent row or rows. It can be appreciated, therefore, that what is needed is a mechanical harvester and method of harvesting that is beneficial for those growers who utilize an overhead trellis system for growing crops, such as grapes and raisins. The desirable harvester and method would be suitable for harvesting crops grown with an overhead trellis system and would permit the harvesting of the crop to take place as quickly and efficiently as possible with the fewest number of laborers and wasted effort moving empty, partially full or full bins. To accomplish this, the desired harvester and method of harvesting should harvest all or the vast majority of the crop off of the plants and permit the empty and full bins to be switched out quickly with as few as laborers as necessary.

SUMMARY OF THE INVENTION

The mechanical harvester and continuous row harvesting method of the present invention solves the problems and provides the benefits identified above. That is to say, the present invention provides a harvester and method of harvesting for crops grown on an overhead trellis system that results in improved removal of the crop off the plants while substantially reducing the amount of time and labor necessary to switch out full bins and replace them with empty bins and to remove the full bins from the field. The use of the harvester and method of the present invention permits nearly continuous harvesting of a row of crops grown on an overhead trellis system. As a result of the use of the harvester and method of harvesting of the present invention, the grower can more efficiently and effectively harvest the crops, such as grapes and raisins, while reducing his or her dependance on manual labor, thereby substantially reducing the cost of such harvesting.

In the primary embodiment of the present invention, the harvester of the present invention primarily comprises a harvester frame having a top portion and a pair of opposing sides with one or more leg members on each side. The harvester frame is shaped and configured so as to permit one or more bins, located on bin trailers being pulled by a tractor or other device, to pass through the harvester frame below the top portion. A crop separating mechanism is attached to the top portion of the frame for separating the crop from the overhead plant material canopy. The crop separating mechanism is configured to extend above the top portion of the harvester frame to engage the overhead plant material so as to cause the fruit to be separated from the canopy and fall into the harvester and then be deposited in a bin. A motor is attached to the harvester frame and is configured to drive one or more wheels that are rotatably attached to each of the leg members. An operator in an operator control unit attached to the harvester frame controls the movement of the harvester through the field. In the preferred embodiment, the harvester has a first conveyor belt in the top portion of the harvester frame that is belt configured for receiving the crop that is separated from the plant material and for moving the crop in a direction substantially parallel to the sides of the harvester frame. The preferred embodiment also comprises a pair of cross conveyor belts for receiving the crop from the first conveyor belt and conveying the crop in a direction inward and substantially perpendicular to the sides of the harvester frame to a center opening between the cross conveyor belts so that it may fall into the bin for transport out of the field. A fan is utilized to blow air across the fruit and associate plant material separated from the canopy so as to cause the plant debris, such as leaves and stems, to be separated from the fruit and directed through a duct unit out a discharge opening on the side of the harvester.

The crop separating mechanism can be a sickle bar having a pair of teeth-shaped bars that reciprocate relative to each other to cut clusters of grapes or raisins off at the stem, an elongated tubular member rotatably attached to the top portion of the harvester frame substantially perpendicular to the sides of the harvester frame and configured to rotate about its longitudinal axis or it can be one or more rows of rod separators that each have a plurality of rods attached to a shaft member. In the preferred embodiment, the rods of the rod separator are in a common plane directed rearward of the forward end of the harvester frame and the shaft member is operatively connected to a drive member, such as a cam, suitable for rapidly moving the rods in a vertical direction so as to impart a flexing action to the rods to better loosen the fruit clusters from the overhead canopy. Preferably, the harvester utilizes multiple types of crop separating mechanisms, with the sickle bar and tubular member being at or near the forward end of the harvester to separate any low hanging fruit clusters from the canopy and the rod separators being rearward of the tubular member to separate any fruit clusters located in the canopy. The harvester should also comprise a mechanism for raising and lowering the top portion of the harvester or the entire frame, as desired, so as to permit the operator to adjust the height of the top portion so that it may safely fit under the trellis system wires or cross-members. The harvester can include a hydraulic powered mechanism for selectively changing the width of the harvester as necessary to accommodate crop rows of different widths.

The method of the present invention preferably comprises the step of locating the harvester at the beginning of a row of overhead plants having crop to be harvested followed by the steps of positioning one or more bins under the top portion of the harvester and adjusting the height of the harvester to fit under the trellis wires. Once the bin is positioned and the height is set, the harvester and bin are moved forward so that the crop separating mechanisms on the harvester may separate the fruit from the overhead plants where it will fall on a first conveyor belt. The first conveyor belt conveys the fruit, consisting of fruit and associated plant material, to one or more cross conveyor belts where it is deposited and then conveyed to a center opening. At the center opening the fruit is dropped into a bin. Once the bin is filled, it is removed from the field and a second bin unit is transported under the top portion of the harvester frame such that an empty bin is located under the center opening to receive additional fruit.

Accordingly, the primary objective of the present invention is to provide a mechanical harvester and continuous row harvesting method for use in overhead trellis systems having the features generally described above and more specifically described below in the detailed description.

It is also an important objective of the present invention to provide a mechanical harvester and harvesting method that substantially reduces the difficulty in supplying a harvester with empty bins and for removing full bins from the field by combining these steps into one step requiring less bins, tractor and trailer units and laborers.

It is also an important objective of the present invention to provide a self-propelled mechanical harvester that comprises a frame member and sides that form a generally upside down U-shaped structure so as to permit bins, and their associated tractors and trailers, to pass through the open space between the top and sides.

It is also an important objective of the present invention to provide a mechanical harvester that has one or more crop separating mechanisms for dislodging fruit from an overhead plant canopy such that it falls on the harvester and is conveyed to one or more bins for storing or transporting the fruit from the field.

Yet another important objective of the present invention is to provide a method of harvesting that permits the grower to harvest an entire row of crops in a continuous fashion without having to stop the harvester to replace full fruit bins with empty bins.

It is a further objective of the present invention to provide a method of collecting fruit from an overhead plant canopy, separating out the plant debris material from the fruit and depositing the fruit into a bin that can be easily removed from the field and replaced with an empty bin.

The above and other objectives of the present invention will be explained in greater detail by reference to the attached figures and the description of the preferred embodiment which follows. As set forth herein, the present invention resides in the novel features of form, construction, mode of operation and combination of parts presently described and understood by the claims.

BRIEF DESCRIPTION OF THE DRAWINGS

In the drawings which illustrate the best modes presently contemplated for carrying out the present invention.

DETAILED DESCRIPTION OF THE PREFERRED EMBODIMENTS

Figure 1:
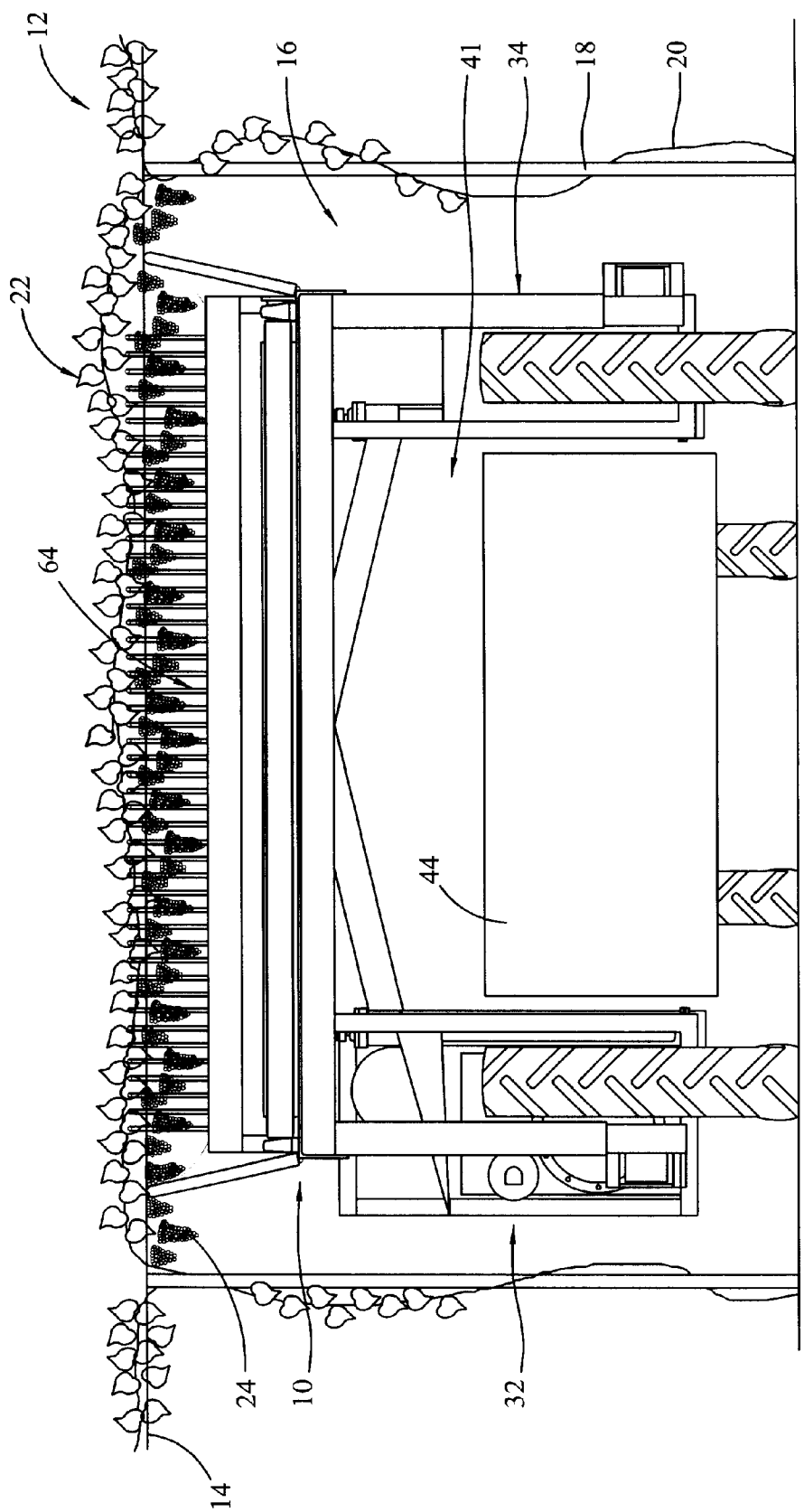
FIG. 1 is a end view of the an overhead plant canopy utilizing an overhead trellis system showing the back view of a harvester of the present invention positioned at the beginning of the row.

With reference to the figures where like elements have been given like numerical designations to facilitate the reader's understanding of the present invention, and particularly with reference to the embodiment of the present invention illustrated in the referenced figures, the preferred embodiments of the present invention is set forth below. The mechanical harvester, designated generally as 10, for use in harvesting crops grown on an overhead trellis system 12 is configured to fit under the overhead trellis wires 14 and in the rows 16 between the plant rows, as defined by the rows of upright supports 18, as shown in FIG. 1. In FIG. 1, the harvester 10 is shown in use with grape or raisin vines having the trunk 20 alongside support 18 with the vine plants 22 forming a canopy across trellis wires 14 and fruit 24 (i.e., grapes or raisins) hanging in and downward from canopy 22. Although the discussion below primarily refers to harvesting grapes and/or raisins utilizing the harvester 10 of the present invention, the invention is not so limited. The present harvester 10 and method of harvesting is also applicable to other crops that require overhead harvesting, such as olives. In addition, the present invention is applicable to a number of different types of overhead trellis systems and is not limited to those having trellis wires 14 and upright supports 18. For instance, the present invention is applicable to those overhead trellis systems that utilize beams instead of wires and to supports 18 with or without cross-arms and the like.

Figure 2:
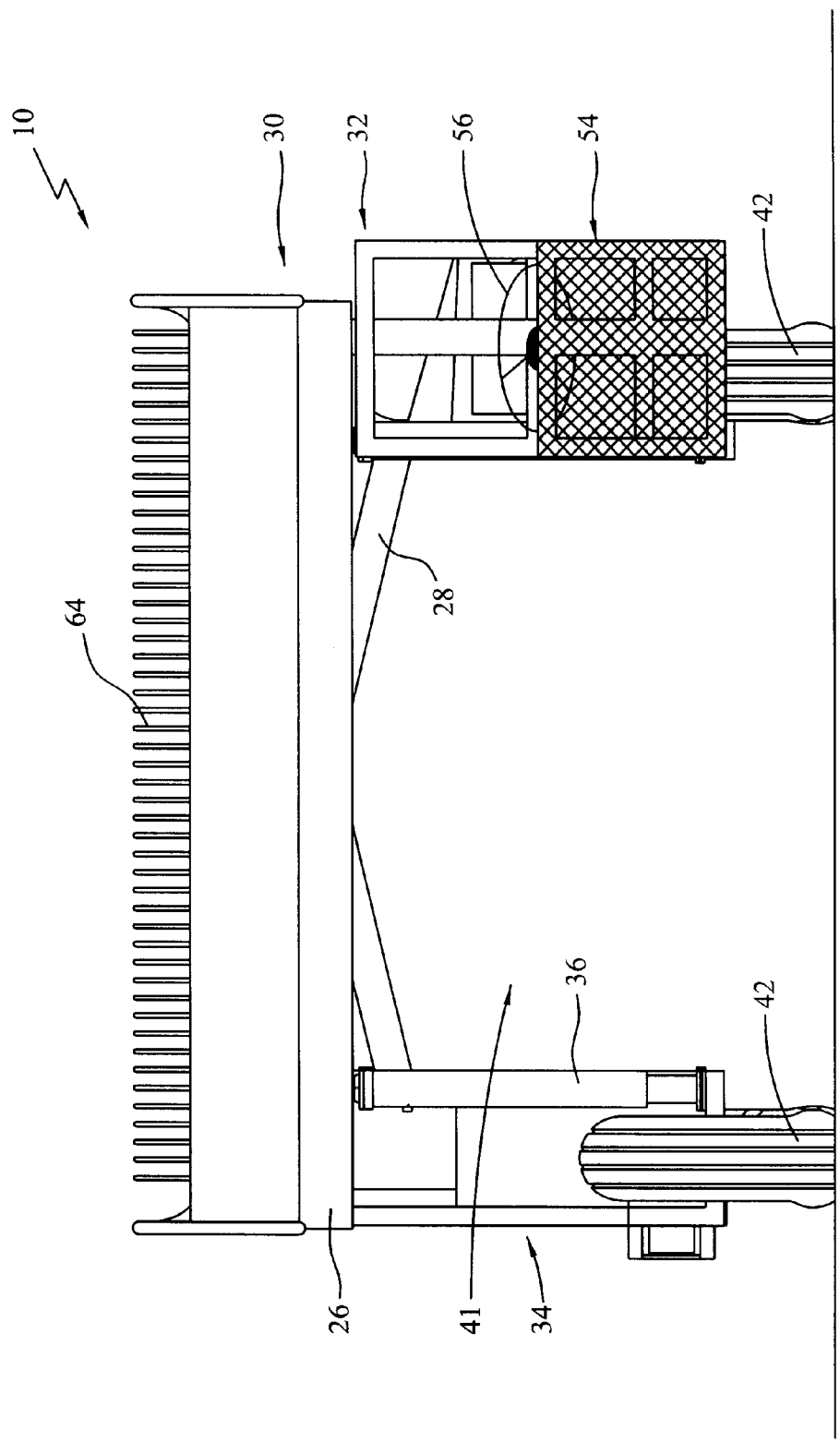
FIG. 2 is a front view of the preferred embodiment of the present invention.
Figure 3:
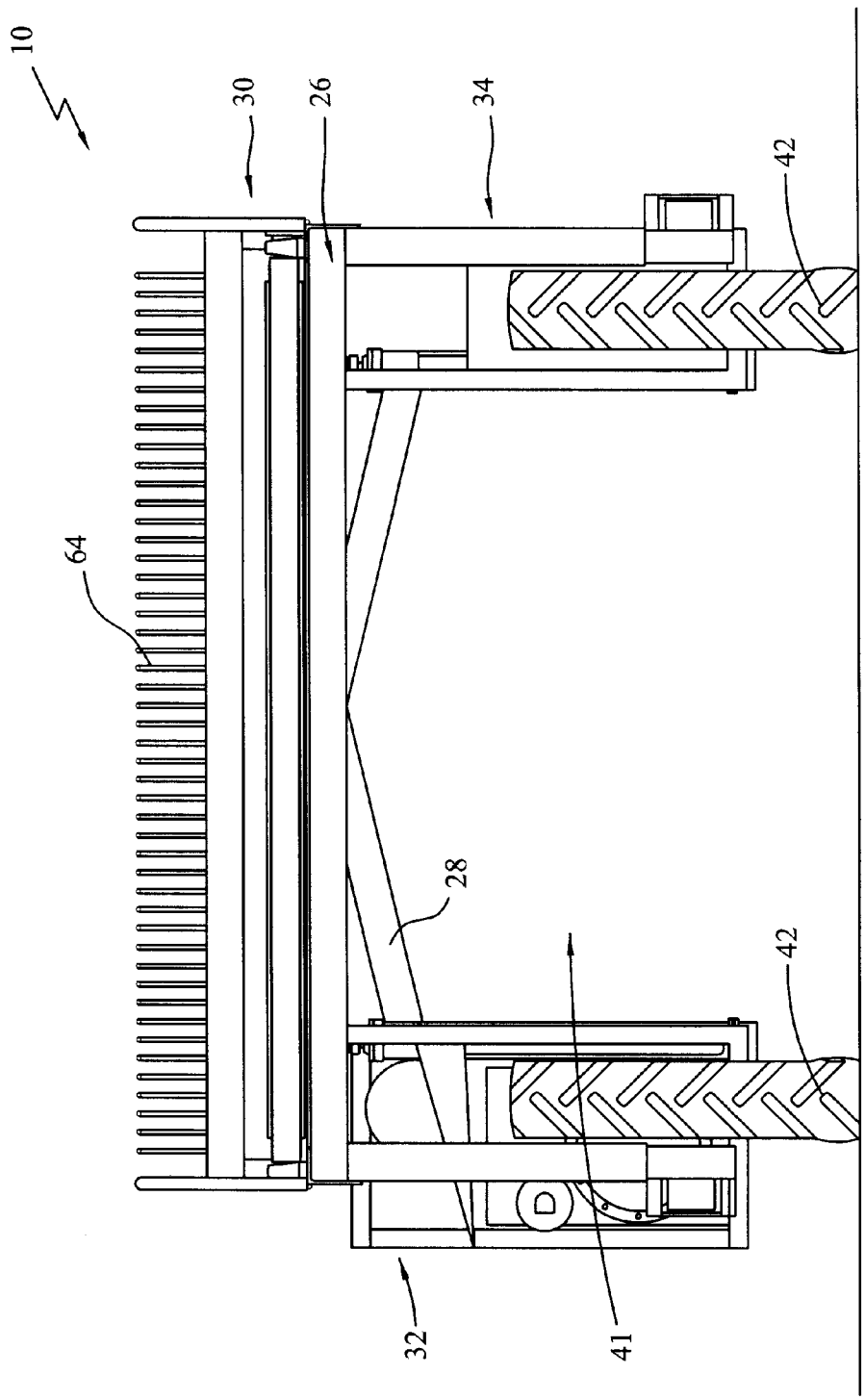
FIG. 3 is a back view of the preferred embodiment of the present invention.
Figure 4:
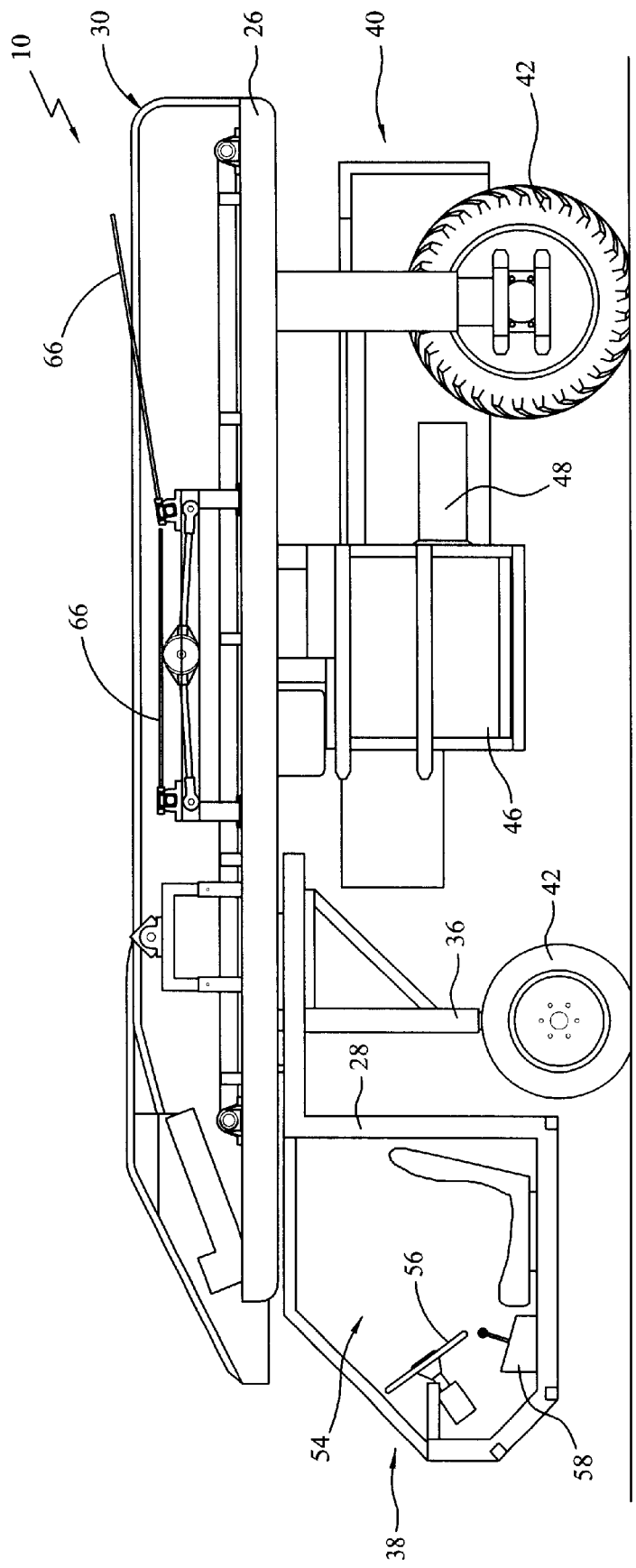
FIG. 4 is a side view of the left or first side of the preferred embodiment of the present invention.
Figure 5:
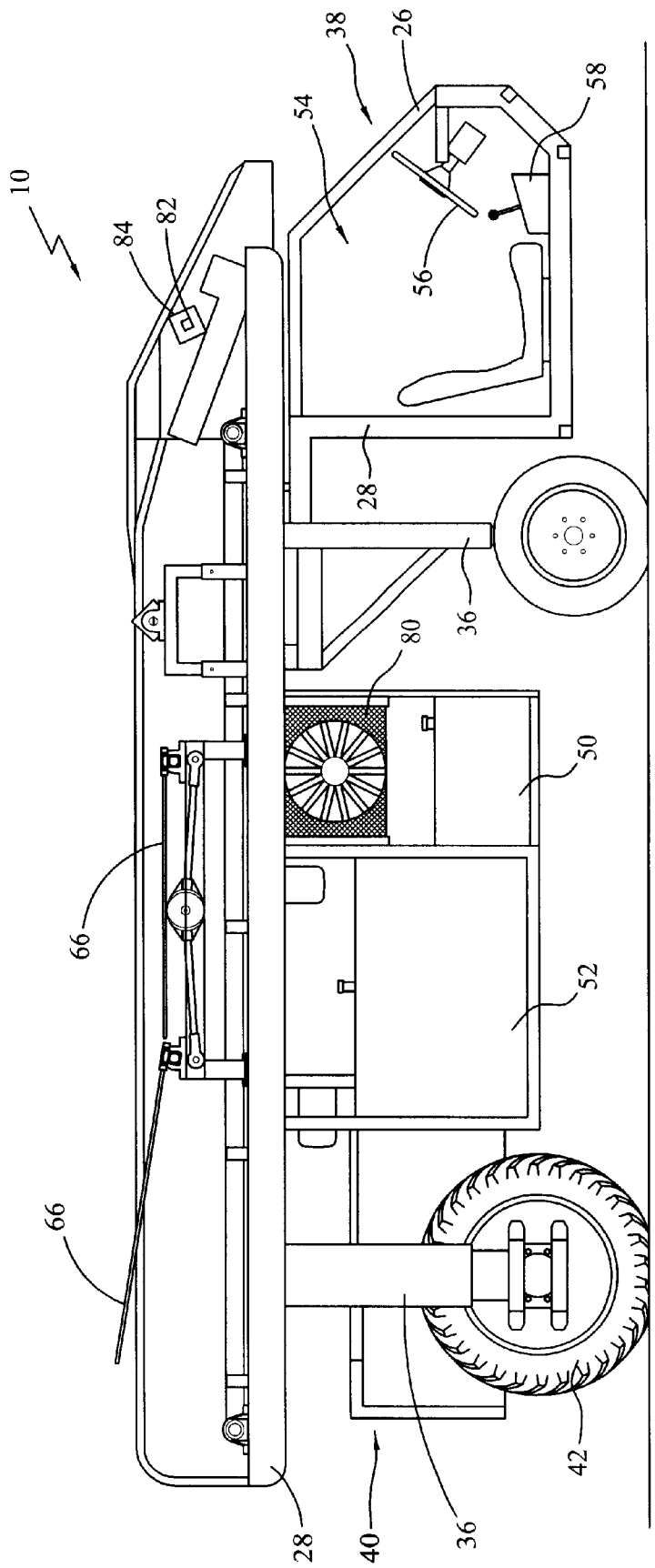
FIG. 5 is a side view of the right or second side of the preferred embodiment of the present invention.

The preferred embodiment of the mechanical harvester 10 of the present invention comprises harvester frame 26 made up of one or more frame members 28 configured together to form a top portion 30 and opposing first side 32 and second side 34. Both first side 32 and second side 34 of harvester 10 have one or more downwardly extending leg members 36 attached to frame member 28. Preferably, sides 32 and 34 comprise a leg member 36 at or near both the front end 38 and back end 40 of harvester 10. With the leg members 36 configured to extend generally downward and perpendicular to top portion 30, harvester 10 forms a generally upside down U-shaped frame (or other open frames) structure having an open space 41, as best shown in FIGS. 2 and 3. Rotatably attached at or near the bottom of each of leg members 36 is a wheel 42 for movement of harvester 10 across the ground. The harvester 10 is configured so as to maximize the ability of one or more transport bins 44 to pass through the open space 41 of harvester frame 26 under top portion 30 and between sides 32 and 34, as discussed in more detail below. Preferably, the major operating components of the harvester 10 of the present invention are located between the wheel 42 at the front end 38 and wheel member 42 at the back end 40 of both sides 32 and 34 and the harvesting components are located in or at the top end 30 of frame 26, as shown in FIGS. 4 and 5. In this way, internal clearance of open space 41 inside harvester frame 26 is obtained so that the bins 44 and associated tractor and/or trailer units (not shown) can pass through harvester frame 26.

The outer dimensions of harvester 10 should be sized to so as to allow harvester 10 to pass in the row 16 between upright supports 18 and vines 20 and below trellis wires 14 without contacting the supports 18, vines 20 or trellis wires 14. A typical configuration for an overhead trellis system for grape or raisin production is to place the vine rows having supports 18 on approximate twelve foot centers with a trellis wire 14 height of approximately eight feet off the ground. The row 16 can be one-half miles or more in length. The dimensions of the overhead trellis systems 12 can vary somewhat depending on the grower. Naturally, lower and/or narrower spacing between the ground and trellis wire 14 and between the upright supports 18 of adjacent rows will require a harvester 10 suitably sized to fit therein. Alternatively, the harvester 10 can be equipped with a mechanism, such as one that is hydraulically controlled, and configured such that the operator is able to adjust the width of the harvester 10 as necessary depending on the width of row 16. There may be a point where a vineyard has too low of trellis wire 14 height and/or too narrow of a row 16 to allow the use of the harvester 10 of the present invention in conjunction with standard sized bins 44 and bin trailers. In these circumstances, harvester 10 will have to be downsized in order to fit within the dimensions of the vineyard and smaller bins 44 and tractor/trailer combinations will have to be used. In the preferred circumstance, however, the grower will plant his or her vineyard to accommodate a harvester 10 that allows the use of standard bins 44 and associated equipment. As discussed in more detail below, harvester 10 can include a mechanism to raise or lower the top portion 30 so as to fit under trellis systems 12 of various heights.

The harvester 10 of the preferred embodiment is self-propelled and includes accommodations for an operator to control the movement of the harvester 10. A motor 46, such as an air cooled diesel engine, can be used to provide the power to move harvester 10. As known to those skilled in the art, a variety of prime movers can be efficiently and effectively utilized for motor 10. The motor 46 should be sized and configured to be able to move the harvester 10 through a vineyard or other field under a variety of ground conditions, including dirt or muddy fields. As shown in FIG. 4, the motor 46 is located between the front and rear wheels 42 on one of sides 32 or 34. In the figures, motor 46 is shown on the first side 32. Motor 46 should be configured to minimize the intrusion into the open space 41 so as to permit bins 44 to easily pass through the harvester 10. In addition to the motor 46, harvester 10 can comprise one or more independent hydraulic pumps 48 to power the propulsion and various accessories of the harvester 10. The pumps 48, as well as the associated hydraulic manifold and valve assemblies, are also located between the front and rear wheels 42 (on first side 32 in FIG. 4). A fuel tank 50 and a hydraulic reservoir tank 52 are also disposed between the front and rear wheels 42 on one side (i.e., second side 34 in FIG. 5) of harvester 10. The fuel tank 50 provides fuel for motor 46 and the hydraulic reservoir tank 52 provides the hydraulic fluid to operate the various hydraulic controls necessary to operate harvester 10. As with the motor 46 and pumps 48, the fuel tank 50, hydraulic reservoir tank 52 and any associated equipment, such as cooling fans, radiators and manifolds, should be configured so as to minimize any intrusion into open space 41 so as not to interfere with the ingress and egress of bins therein. The electrical, hydraulic and mechanical components are connected through the use of appropriate wires, high pressure hydraulic hoses, JVC fittings and steel sleeved cables.

The operator compartment 54, best shown in FIGS. 2, 4 and 5, includes a steering wheel 56 and gear shifting mechanism 58, as needed, to allow an operator located inside operator compartment 54 to control the movement of the harvester 10. As shown in the attached figures, the operator compartment 54 can be located at or near the front end 38 of harvester 10 so the operator therein can see in the forward direction in order to keep harvester 10 in row 16 between the upright supports 18 and vine trunks 20 and avoid collisions with other objects or persons. Although shown at the front end 38 of the first side 32, the operator compartment can be located on the second side 34 or elsewhere on harvester frame 26, including at or near the back end 40 of harvester 10. The operator compartment 54 should include one or more wall members or protective plates or screens (not shown) around compartment 54 to safely enclose the operator therein and protect him or her from falling or flying debris that may result from the harvesting of the fruit 24 off of vine plants 22.

Figure 6:
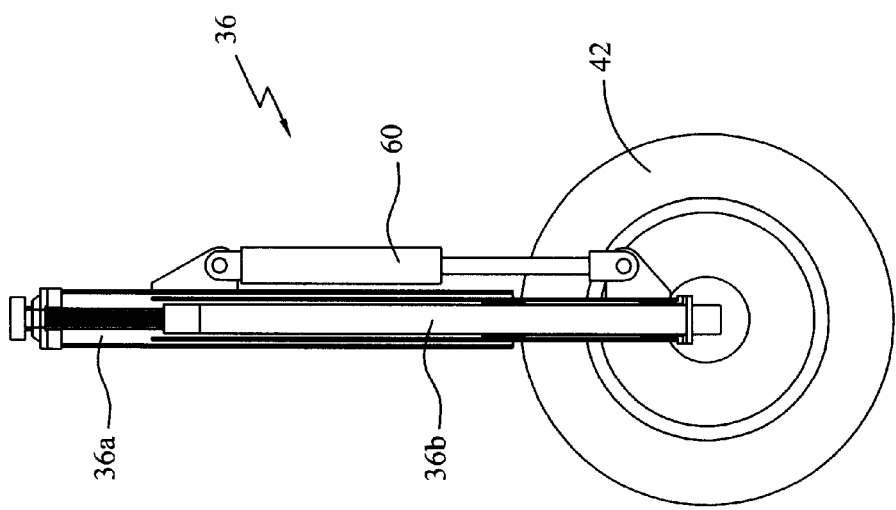
FIG. 6 is a cross-sectional view of leg member of the present invention.

In the preferred embodiment of the harvester 10 of the present invention, the steering wheel 56 connects to a steering mechanism that is part of a front end assembly that includes a trunnion assembly having a threaded shaft connecting both wheels 42 at the front end 38 of harvester 10. The front end assembly can connect to one or more forward cross members that extend between frame members 28 to provide bracing support to harvester frame 26. The wheels 42 at the back end 40 of harvester 10 are operatively connected to be driven by motor 46 so as to provide the power to move harvester in a forward or rearward direction, as selected by the operator. In one configuration, mounted at each of the rear wheel assemblies is an individual hydraulic wheel motor which drives the rear wheel assembly, comprised of a rim and wheel 42. The various wheel assemblies rotatably connect to leg members 36. As shown in FIG. 6, leg members 36 comprise a hollow tube support, such as a square tubing 36a, having an inner steel tube 36b with four plastic bearing surfaces therein to provide for smooth, even vertical movement of leg members 36 to raise or lower frame 26 so that the top portion can be located just below the trellis wires 14 of an overhead trellis system 12. The front wheel assemblies are adapted to include central mounted steering shafts. Attached to each sleeved leg member 36 is a hydraulic cylinder 60 that is connected to the hydraulic system on harvester 10 so as to provide the lift and drop for raising and lowering harvester frame 26 in order to provide for vineyards having different trellis heights. The hydraulic cylinder 60 can be of the type such as Energy CRT SAE 2×12, or other such cylinders 60. In one configuration, the harvester 10 can move vertically up or down within a twelve inch maximum stroke by merely activating the appropriate levers for each leg 36 of the harvester 10.

Figure 7:
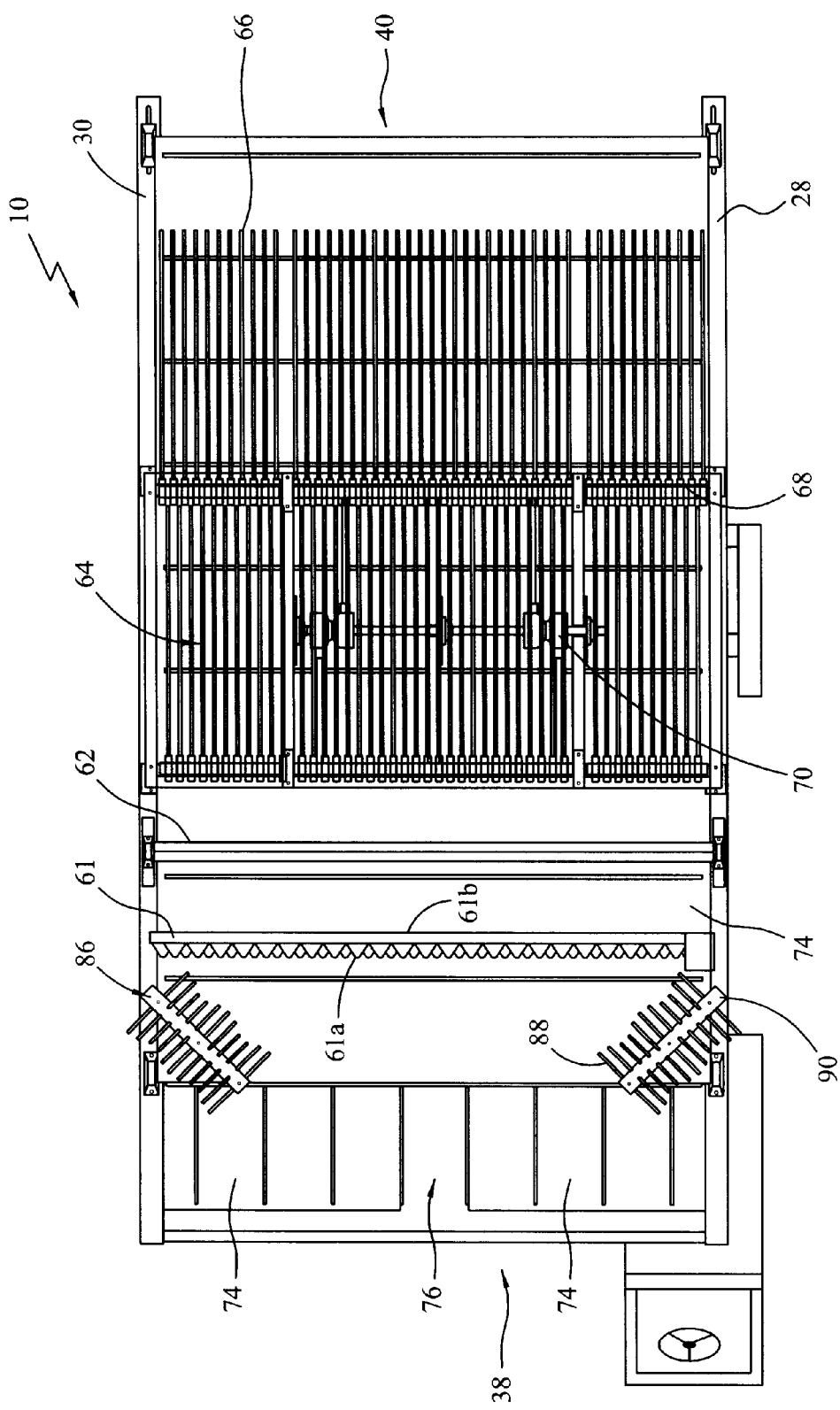
FIG. 7 is top perspective view of the preferred embodiment of the present invention.

The harvester 10 of the present invention has at least one crop separating mechanism designed to efficiently and effectively separate grapes or raisins 24 from the vegetative fruiting canes 22 in the canopy over the trellis wires 14 of the overhead trellis system 12. As shown in FIG. 7, the harvester 10 utilizes a combination of known mechanisms to separate the fruit 24 from the vines 22. Although the crop separating mechanisms can be utilized alone, the preferred embodiment of the present invention utilizes a combination of mechanisms to more fully remove the fruit 24 from the vine plants 22 in the canopy above the trellis wires 14. The first, meaning at or near the front end 38 of harvester 10, crop separating mechanism is a sickle bar device 61 that is used for cutting the fruit 24 from the vine plants 22 by cutting it off above the clusters of fruit 24 at the stem. The sickle bar 61 shown in FIG. 7 utilizes a pair of serrated bars 61a and 61b that has bar 61b disposed above bar 61a in an overlapping manner. Bar 61b reciprocates relative to bar 61a (in one configuration) such that a cutting action is achieved between the "teeth" of the bars 61a and 61b. The sickle bar 61 is adjusted to be at a level above the clusters of fruit 24 so that it will cut the stems without damaging the fruit 24, whether grapes or raisins, that are desired to be left in clusters. In the preferred embodiment, sickle bar 61 is detachable from harvester 10.

The second crop separating mechanism, positioned rearward of sickle bar 61, is an elongated tubular member 62 rotatably attached to the top portion 30 of harvester frame 26 so that it is substantially perpendicular to the sides 32 and 34 of harvester 10. The tubular member 62 is configured to rotate about its longitudinal axis so that it can impart a rolling action for harvesting low hanging clusters of fruit 24 and knock them down onto the conveyor system described below. In order to achieve the maximum harvesting and reduce the amount of fruit 24 remaining on the vines, the tubular member should extend across the entire width of harvester 10 so that most of the fruit 24 hanging from the overhead trellis system 12 at or near the edges of row 16 can also be harvested. The frame support for tubular member 62 can be fixedly attached to top portion 30 or it can be adjustably connected to allow it to move upward or downward relative to top portion 30. As with sickle bar 61, tubular member 62 can be detachable from harvester 10.

The third crop separating mechanism, located rearward of tubular member 62, comprises one or more rows of rod separators 64. Each of the rod separators 64 has a plurality of rods 66 attached to a shaft member 68 that extends across the entire width of harvester 10 so as to contact the vine plants 22 and thereby dislodge fruit 24 from the entire width of row 16. In the preferred embodiment, as shown in FIG. 7, there are two rows of rod separators 64 located substantially parallel to each other and perpendicular to sides 32 and 34 of harvester 10. The rods 66 are connected to shaft member 68 such that the rods are substantially in a common plane capable of extending upward from top portion 30 of harvester 10. The shaft member 68 of each row separator 64 is operatively connected to a drive member, such as a rotating cam 70, to produce a rapid upward and downward stroke. By producing the rapid upward and downward stroke, the cam 70 causes the shaft member 68 to flex the rods 66 to obtain a rapid whipping action whereby the rods 66 extend upward into and above the trellis wires 14 to contact the leaves and stems in the canopy of vine plants 22 below and above the trellis wires 14 to shake the vines 22 and remove the fruit 24. To provide the necessary contact action, the rods 66 should be configured to be flexible. In one configuration, the harvester 10 utilizes approximately fifty rods 66 made out of fiberglass and approximately four feet in length having a diameter of one-half of an inch. This configuration results in the rods 66 flexing in a vertical direction of travel approximately twenty-four to thirty-six inches at the end of the rods 66 furthest from shaft 68. Depending on the configuration of the harvester 10 the rods should have a length between 40 and 60 inches and the number of rods can vary from 40 to 60 per row (80 to 120 per harvester 10). Other materials can be used for rods 66, including various metals, composites or polymers that provide sufficient flexibility and are able to withstand repeated contact against the vines 22 and trellis wires 14. The rods 66 should be removably attached to shaft member 68 so that they can be replaced as needed. By using a second or subsequent row of rod separators, the harvester 10 will be more effective at removing the fruit 24 from the canopy of vines 22 hanging below and above trellis wires 14.

As stated above, the use of the combination of sickle bar 61, tubular member 62 and rod separators 64 is preferred so as to most efficiently and effectively remove the fruit 24 from vines 22. In addition, it is preferred that the sickle bar 61 and tubular member 62 be forward of rod separators 63 so that the cutting action of sickle bar 61 and the rolling action of tubular member 62 can more gently remove the low hanging clusters, thereby avoiding damage to that fruit 24, particularly fruit such as grapes, from the whipping action of rods 66. Use of the tubular member 62 alone has the disadvantage of not being able to effectively dislodge the fruit 24 which is located primarily or entirely above the trellis wires 14 or that fruit which is more securely attached to the vine plants 22. The multiple harvesting mechanism solves the problems faced by other prior art harvesters, thereby reducing the need for a crew of laborers to go through the field and pick the fruit 24 that typically remains after the mechanical harvesting of the vineyard. In one embodiment of the present invention, the crop separating mechanisms are connected to small hydraulic motors connected by sprockets and chains to turn a series of shafts and cams to produce the motion necessary to energize the rods 66.

Directly below the crop separating mechanisms, sickle bar 61, tubular member 62 and/or rod separators 64, is located a first conveyor belt 72 to receive and transport all the fruit 64 and associated debris (i.e., leaves, stems and other material) that falls as a result of the crop separating mechanisms. In the preferred embodiment, the first conveyor belt 72 conveys fruit 64 and debris material forward toward the front end 38 of harvester 10. Although the fruit 24 and debris could be deposited into the bins 44 directly, the preferred procedure is to convey this material onto a cross conveyor belt 74 that carries the material inward from the sides 32 and/or 34 toward the center of harvester 10. Preferably, two cross conveyor belts 74 are utilized, as shown in FIG. 7, to convey material from both sides 32 and 34 towards an opening 76 at or near the center of harvester 10 forward of the first conveyor belt 72. In one configuration, but not the only possible configuration, the conveyor belt assemblies 72 and 74 have a front pulley and a rear tensioning steel shaft driven by a hydraulic motor, sprocket and chain assembly. The first conveyor belt 72 and cross conveyor belts 74 should be mounted so as to provide adequate tension so as to maintain a continuous flat rolling surface for ease of conveying the fruit and associated debris material. Additional plating, sheeting and guarding should be incorporated into harvester 10 so as to minimize loss of fruit during harvesting and to provide for safe use of harvester.

To improve the efficiency of the conveyors 72 and 74, a diversion member (not shown) can be used to divert the material being conveyed on the first conveyor belt 72 to the two cross conveyor belts 74. To reduce the amount of debris material deposited in bins 44, the harvester 10 can include a fan 80 that blows air upward into a duct system 82 and out discharge opening 84. The fan 80 can be sized and configured to blow a sufficient rate of air into duct system 82 such that it causes most of the debris material to flow upward with the air into the ducts 82 and out discharge opening 84, thereby reducing the amount of non-fruit debris that is deposited in bins 44. This will reduce the number of bins required and reduce the amount of bin swapping necessary to harvest a field.

As shown in FIG. 7, harvester 10 can also comprise one or more side separator mechanisms 86. In the preferred embodiment, two side separator mechanisms 86 are utilized, one on each side 32 and 34 at the front end 38 of harvester 10. Side separator mechanisms comprise a plurality of small rods 88 (of similar configuration as rods 66) attached to a frame member 90 that is pivotally attached to the top portion 30 of harvester 10. Side separators 86 are configured to be adjusted to pivot out at various angles to engage fruit 24 that is hanging at or near the edges of row 16. An oscillating unit can be utilized to cause the rods 88 to rotate about the longitudinal axis of frame member 90 so as to more fully disengage fruit 24 from vine plants 22.

Figure 8:
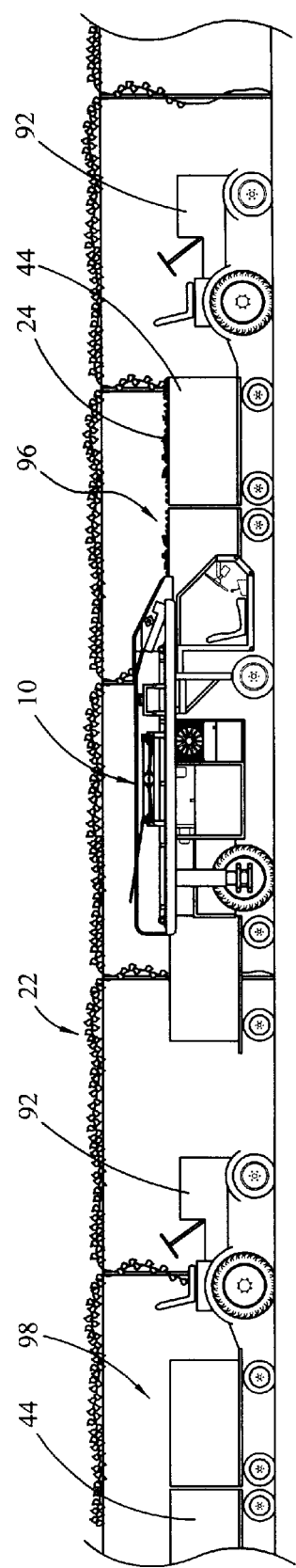
FIG. 8 is a side view of the harvester of the present invention with a first and second bin unit in a row of plants grown on an overhead trellis system.

In use, the harvester 10 is driven or transported to the opening of a row 16 of a vineyard utilizing an overhead trellis system 12. Once located at the beginning of the row 16, the height of harvester 10 is adjusted such that the top portion is just below the trellis wires 14 and so the crop separating mechanism can contact the clusters of fruit hanging below the wires 14 and in the canopy of vines 22 above the wires 14. As shown in FIG. 8, a tractor 92 and bin trailer 94 having one or more bins 44 thereon, the bin trailer 94 and bins 44 comprising first bin unit 96, are driven through the open space 41 in harvester 10 from behind harvester 10 to position an empty bin 44 directly below the center opening 76 so that it may receive fruit 24 from cross conveyor belts 74. The harvester 10 operating system and the crop separating mechanisms 61, 62 and/or 64 are activated to begin the harvesting operation. If necessary, side separator mechanisms 86 can also be utilized. The harvester 10 and tractor and bin trailer 44 are driven forward together down the row 16 so the tubular member 62 and rod separators 64 can engage the fruit 24 and canopy of vines 22 to dislodge the fruit 24 from the vines 22. Once the fruit 24 is separated from the canopy of vines 22 it falls downward onto or into the top portion 30 of harvester 10 behind the sickle bar 61 or tubular member 62 or through the rods 66. The first conveyor belt 72 conveys the material forward and deposits it on the two cross conveyor belts 74, which convey the material towards the center opening 76 so that the fruit 24 will fall through the opening 74 and into bin 44 located under the opening 74. Fan 80 blows upward the loose plant and other debris through ducts 82 to discharge opening 84.

As shown in FIG. 8, as the fruit 24 is being removed from the overhead canopy by harvester 10, a second tractor and bin trailer unit 98 follows behind the harvester 10. When the first unit 96 has all of its bins 44 filled, it is moved forward away from the harvester 10 and the second unit 98 is moved into position through open space 41 to position an empty bin 44 under center opening 76. The first unit 96 takes its full bins 44 out of the row 16 and delivers the bins 44 to the end of the row 16 for later pick-up. The first unit 96 then obtains empty bins 44 and reenters the same row 16 behind the second unit 98, ready to take its place under harvester 10 as soon as the bins 44 are full on the second unit 98.

Based on field trials of the harvester 10 of the present invention, the harvester is able to harvest at one to three miles per hour based on a yield of twenty-five tons green grapes per acre or six tons of raisins per acre, which is a substantial improvement over prior art harvesters. The harvester 10 and method of the present invention reduces the manpower required to effectively harvest a crop, such as grapes or raisins, to only three people, each of which are driving and operating mechanical equipment. Utilizing the harvester 10 and method of the present invention, a grower can essentially continuously harvest an entire row 16 of crops without have to stop and replace full bins 44 with empty bins 44. This significantly speeds up the harvesting process and provides substantial further benefits to overhead trellis systems, including DOV raisin production.

While there is shown and described herein certain specific alternative forms of the invention, it will be readily apparent to those skilled in the art that the invention is not so limited, but is susceptible to various modifications and rearrangements in design and materials without departing from the spirit and scope of the invention. In particular, it should be noted that the present invention is subject to modification with regard to the dimensional relationships set forth herein and modifications in assembly, materials, size, shape, and use.

What is claimed is:

1. A harvester for separating a crop from a row of overhead plant material, the harvester comprising:
    a harvester frame having a top portion and a pair of opposing sides, each of said sides having one or more leg members, said harvester frame shaped and configured to form an opening to permit one or more bins to completely pass through said harvester below said top portion of said harvester frame without substantial interference by said harvester;
    a crop separating means on said frame for separating the crop from the overhead plant material, said crop separating means configured to extend above said top portion of said harvester frame to engage the overhead plant material;
    a motor attached to said harvester frame, said motor configured to drive one or more wheels rotatably attached to each of said leg members; and
    an operator control unit attached to said harvester frame to control the movement of the harvester;
    whereby said one or more bins can ingress and egress through the harvester without stopping the movement of the harvester in said row.

2. The harvester according to claim 1 further comprising a first conveyor belt in said top portion of said harvester frame, said first conveyor belt configured for receiving the crop separated from the plant material and depositing the crop into said one or more bins.

3. The harvester according to claim 2 further comprising one or more cross conveyor belts for receiving the crop from said first conveyor belt and transporting the crop in a direction inward and substantially perpendicular to said sides of said harvester frame.

4. The harvester according to claim 3 further comprising a pair of cross conveyor belts and an opening disposed between said pair of cross conveyor belts, said cross conveyor belts suitable for depositing the crop through said opening and into said one or more bins.

5. The harvester according to claim 1, wherein said crop separating means comprises an elongated tubular member rotatably attached to said top portion of said harvester frame substantially perpendicular to said sides of said harvester frame, said tubular member configured to rotate about its longitudinal axis.

6. The harvester according to claim 1, wherein said crop separating means comprises one or more rows of rod separators, each of said rod separators having a plurality of rods attached to a shaft member.

7. The harvester according to claim 6, wherein said crop separating means further comprises an elongated tubular member rotatably attached to said top portion of said harvester frame substantially perpendicular to said sides of said harvester frame, said tubular member configured to rotate about its longitudinal axis.

8. The harvester according to claim 6, wherein said plurality of rods are in a common plane and directed rearward of said forward end of said harvester frame.

9. The harvester according to claim 6, wherein said shaft member is operatively connected to a drive member suitable for rapidly moving said rods in an vertical direction.

10. The harvester according to claim 6, wherein said crop separating means comprises a sickle bar device.

11. The harvester according to claim 1 further comprising a fan attached to said harvester frame below said top portion.

12. The harvester according to claim 1, wherein said harvester frame further comprises means for raising and lowering said top portion of said harvester frame.

13. The harvester according to claim 1, wherein said overhead plant material is growing on an overhead trellis system having one or more rows of said plant material and said harvester frame is sized so said top portion of said harvester frame is below said trellis system.

14. A harvester for separating a crop from overhead plant material, the harvester comprising:
   a harvester frame having a top portion and a pair of opposing sides, each of said sides having one or more leg members, said harvester frame shaped and configured to form an opening to permit one or more bins to pass through said harvester frame below said top portion;
   a crop separating means on said frame for separating the crop from the overhead plan material, said crop separating means configured to extend above said top portion of said harvester frame to engage the overhead plant material;
   a first conveyor belt in said top portion of said harvester frame below said crop separating means, said first conveyor belt configured for receiving the crop separated from the overhead plant material and depositing the crop into said one or more bins;
   a fan attached to said harvester frame below said top portion, said fan configured to blow air across the crop separated from the overhead plant material;
   a motor attached to said harvester frame, said motor configured to drive one or more wheels rotatably attached to each of said leg members; and
   an operator control unit attached to said harvester frame to control the movement of ti harvester.

15. The harvester according to claim 14 further comprising one or more cross conveyor belts for receiving the crop from said first conveyor belt and transporting the crop in a direction inward and substantially perpendicular to said sides of said harvester frame.

16. The harvester according to claim 15 further comprising a pair of cross conveyor belts and an opening disposed between said pair of cross conveyor belts, said cross conveyor belts suitable for depositing the crop through said opening and into said one or more bins.

17. The harvester according to claim 14, wherein said crop separating means comprises an elongated tubular member rotatably attached to said top portion of said harvester frame substantially perpendicular to said sides of said harvester frame, said tubular member configured to rotate about its longitudinal axis.

18. The harvester according to claim 14, wherein said crop separating means comprises one or more rows of rod separators, each of said rod separators having a plurality of rods attached to a shaft member.

19. The harvester according to claim 18, wherein said crop separating means further comprises an elongated tubular member rotatably attached to said top portion of said harvester frame substantially perpendicular to said sides of said harvester frame, said tubular member configured to rotate about its longitudinal axis.

20. The harvester according to claim 18, wherein said plurality of rods are in a common plane and directed rearward of said forward end of said harvester frame.

21. The harvester according to claim 18, wherein said shaft member is operatively connected to a drive member suitable for rapidly moving said rods in an vertical direction.

22. The harvester according to claim 14, wherein said crop separating means comprises a sickle bar device.

23. The harvester according to claim 14, wherein said harvester frame further comprises means for raising and lowering said top portion of said harvester frame.

24. A method of continuously harvesting a row of a crop from overhead plant material grown on an overhead trellis system utilizing a harvester having a top portion and two opposing sides forming an open space therebetween, comprising the steps of:
   a. positioning said harvester at the beginning of said row;
   b. positioning a first bin unit having one or more bins under said top portion of said harvester;
   c. driving said harvester through said row under said overhead trellis system with said first bin unit remaining substantially positioned under said harvester;
   d. positioning a second bin unit behind said first bin unit;
   e. separating said crop from said overhead plant material by contacting said plant material with a crop separating means on said top portion of said harvester;
   f. depositing said crop into said one or more bins in said first bin unit;
   g. removing said first bin unit from under said harvester when said one or more bins are substantially full of crop; and
   h. positioning said second bin unit under said top portion of said harvester without stopping said harvester.

25. The harvesting method according to claim 24 further comprising the step of conveying said crop along a first conveyor belt in a direction substantially parallel to said sides of said harvester before the step of depositing said crop into said one or more bins.

26. The harvesting method according to claim 25 further comprising the step of depositing said crop on one or more cross conveyor belts and transporting said crop on said cross conveyor belts in a direction inward and substantially perpendicular to said sides of said harvester frame after said step of conveying said crop along a first conveyor belt.

27. The harvesting method according to claim 26 further comprising the step of depositing said crop through an opening between a pair of cross conveyor belts after the step of transporting said crop on said cross conveyor belts and before the step of depositing said crop into said one or more bins.

28. The harvesting method according to claim 24, wherein said crop separating means comprises an elongated tubular member rotatably attached to said top portion of said harvester frame substantially perpendicular to said sides of said harvester frame, said tubular member configured to rotate about its longitudinal axis.

29. The harvesting method according to claim 24, wherein said crop separating means comprises one or more rows of rod separators, each of said rod separators having a plurality of rods attached to a shaft member.

30. The harvesting method according to claim 29, wherein said crop separating means further comprises an elongated tubular member rotatably attached to said top portion of said harvester frame substantially perpendicular to said sides of said harvester frame, said tubular member configured to rotate about its longitudinal axis.

31. The harvesting method according to claim 29, wherein said plurality of rods are in a common plane and directed rearward of said forward end of said harvester frame.

32. The harvesting method according to claim 29, wherein said shaft member is operatively connected to a drive member suitable for rapidly moving said rods in an vertical direction.

33. The harvester according to claim 29, wherein said crop separating means comprises a sickle bar device.

34. The harvesting method according to claim 24 further comprising the step of blowing air across said crop before the step of depositing said crop into said one or more bins.

* * * * *